United States Patent [19]

Newington et al.

[11] Patent Number: 5,532,290

[45] Date of Patent: Jul. 2, 1996

[54] ANTIMICROBIAL POLYMERS AND COMPOSITIONS CONTAINING THEM

[75] Inventors: Ian M. Newington, High Wycombe; Kevin J. Parr, Harrow Weald, both of Great Britain; Patricia I. Bowman, Upper Saddle River; Karen A. McCue, Tenafly, both of N.J.

[73] Assignee: Reckitt & Colman Inc., Montvale, N.J.

[21] Appl. No.: 134,713

[22] Filed: Oct. 12, 1993

[30] Foreign Application Priority Data

Sep. 2, 1993 [GB] United Kingdom .................. 9318170

[51] Int. Cl.$^6$ .............................. C08K 5/20; C08F 16/00; C08F 18/22; C09D 5/14
[52] U.S. Cl. ..................... 523/122; 525/328.2; 525/384; 528/86
[58] Field of Search ............................... 523/122; 528/86; 424/405; 524/323; 525/328.2, 384

[56] References Cited

U.S. PATENT DOCUMENTS

| | | | |
|---|---|---|---|
| 2,873,263 | 2/1959 | Joginder et al. | 523/122 |
| 3,808,010 | 4/1974 | Farber | 523/122 |
| 3,926,644 | 12/1975 | Kaye | 523/122 |
| 4,257,907 | 3/1981 | Langguth et al. | 252/106 |
| 4,642,264 | 2/1987 | Ropars et al. | 524/323 |
| 4,908,381 | 3/1990 | Greenwald et al. | 514/460 |
| 5,051,454 | 9/1991 | Lemon et al. | 523/146 |

*Primary Examiner*—Paul R. Michl
*Assistant Examiner*—Lavonda R. DeWitt
*Attorney, Agent, or Firm*—Frederick H. Rabin; John R. Everett

[57] ABSTRACT

A polymer having antimicrobial properties derived from one or more ethylenically unsaturated monomers characterized in that the polymer has a phenolic antimicrobial agent covalently bound thereto. The polymer may be used as a sanitizing agent in a sanitizing composition comprising a solvent having a sanitizing agent dissolved or dispersed therein.

11 Claims, No Drawings

ANTIMICROBIAL POLYMERS AND COMPOSITIONS CONTAINING THEM

FIELD OF THE INVENTION

The invention relates to polymers having antimicrobial properties and to compositions containing them.

BACKGROUND OF THE INVENTION

Polymeric materials having antimicrobial properties are known. For example, U.S. Pat. No. 4,908,381 describes polymers derived from ethylenically unsaturated monomers having side chains terminating in a pyran derivative. The polymers can be applied to a surface from solution in an organic solvent such as acetone to provide a film of the polymer over the surface. The film protects the surface from microbial growth through the slow release of the potent antimicrobial agent, glutaraldehyde, upon contact with water.

PROBLEM TO BE SOLVED BY THE INVENTION

An object of the invention is to provide a polymer which will provide prolonged antimicrobial activity without releasing an antimicrobial agent. A further object is to provide such a polymer wherein the antimicrobial activity is provided, at least in part, by a phenolic antimicrobial agent.

SUMMARY OF THE INVENTION

In accordance with the invention there is provided a polymer having antimicrobial properties derived from one or more ethylenically unsaturated monomers characterised in that the polymer has a phenolic antimicrobial agent covalently bound thereto.

The invention also provides a sanitising composition comprising a solvent having a sanitising agent dissolved or dispersed therein characterised in that the sanitising agent comprises a polymer of the invention.

ADVANTAGEOUS EFFECT OF THE INVENTION

The polymers of the invention can be coated on surfaces to provide the antimicrobial protection afforded by a phenolic antimicrobial agent over a prolonged period.

The polymers can provide unexpectedly low concentration efficacy and low dilution factor.

In certain embodiments of the invention, additional antimicrobial protection is afforded by the presence of both the quaternary and phenolic groups in the polymer.

DETAILED DESCRIPTION OF THE INVENTION

Preferably, the monomers from which the polymer is derived include monomers which are quaternisable or which are capable of reacting with amine or hydroxyl groups. Such monomers include ethylenically unsaturated carboxylic acids, ethylenically unsaturated carboxylic anhydrides, aminoalkyl esters of ethylenically unsaturated carboxylic acids, hydroxyalkyl esters of ethylenically unsaturated carboxylic acids, glycidyl esters of ethylenically unsaturated carboxylic acids, ethylenically unsaturated nitrogen containing heterocycles and ethylenically unsaturated monomers comprising a haloalkyl group.

Specific examples of such monomers include maleic anhydride, methacrylic acid, glycidylmethacrylate, dimethylaminoethylmethacrylate, N-vinylpyridine, N-[6-(pentafluorophenoxycarbonyl)hexyl]methacrylamide and chloromethylstyrene.

These functionalised monomers provide the means of covalently attaching a phenolic antimicrobial agent to the polymer.

Preferably, the monomers from which the polymer is derived also include monomers which impart the desired physical properties to the polymer. Such monomers include alkyl esters of ethylenically unsaturated carboxylic acids, alkyl amides of ethylenically unsaturated carboxylic acids, ethylenically unsaturated nitrogen containing heterocycles and ethylenically unsaturated aromatic compounds.

Specific examples of such monomers include methylmethacrylate, dimethylacrylamide, styrene and N-vinylpyrollidone.

Many phenolic antimicrobial agents are known These include phenol, 2-phenylphenol, 2-benzyl-4-chlorophenol, allylphenylphenol, m-cresol, o-cresol, p-cresol, 4-chloro-m-cresol, 6-amyl-m-cresol and resorcinol.

The phenolic antimicrobial agent can be attached to the polymer by covalent linkages that are variable in length and chemistry.

In a preferred method of making the polymers of the invention, the desired ethylenically unsaturated monomers are polymerised by free radical polymerisation in solvent solution e.g. dioxane or ethanol solution or in aqueous suspension using a polymerisation initiator such as azobisisobutyronitrile. A suitably functionalised phenolic antimicrobial agent can then be covalently attached to the prepolymer by reaction with the monomer units which are quaternisable or which are capable of reacting with amine or hydroxyl groups. Suitable substituents on the phenolic antimicrobial agent facilitating attachment include a hydroxy containing substituent other than the phenolic hydroxy group providing antimicrobial activity e.g. a hydroxyalkyl group; an amine containing substituent e.g. a dialkylaminoalkyl group; or a halo containing substituent e.g. haloalkyl.

Alternatively, a suitably functionalised phenolic antimicrobial agent can be covalently attached to the monomer before polymerisation. Polymerisation of the monomers then results in formation of the desired polymer.

The polymers of the invention are preferably film-forming and preferably have a glass transition temperature, Tg, greater than 60° C. The weight average molecular weight of the polymer is preferably in the range from 1,000 to 250,000, more preferably from 25,000 to 180,000, polymethylmethacrylate equivalent as measured by size exclusion chromatography.

Preferred polymers have a limited water solubility which, while not affecting the prolonged antimicrobial activity of the polymer, allows the polymer to be coated from a water containing solvent e.g. ethanol/water (80:20).

Different options for producing the desired properties of the polymer have been discovered. For example, monomer unit ratios can be changed to alter the hydrophobic/hydrophilic balance of the polymer. The more hydrophobic the polymer, the longer it takes to solubilise in water. Changing the molecular weight of the polymer will also affect the rate of dissolution. In polymers containing quaternary sites, the degree of quaternisation has been found to affect solubility. The degree of quaternisation is the percentage of available amino sites which have been quaternised. Increasing the number of quaternary sites leads to an increase in solubility.

Particularly preferred polymers of the invention are those wherein the phenolic antimicrobial agent is bound to the polymer through quaternisation. In this instance, the phenolic group bound through quaternisation is more active.

In a preferred embodiment of the invention, the polymer comprises units derived from a dialkylaminoalkyl ester of an ethylenically unsaturated carboxylic acid e.g. dimethylaminoethylmethacrylate. Preferably, the polymer also comprises units derived from an alkyl ester of an ethylenically unsaturated carboxylic acid e.g. methylmethacrylate.

Preferably, the polymer comprises from 15 to 75, more preferably from 40 to 60, mole percent of the units derived from an aminoalkyl ester of an ethylenically unsaturated carboxylic acid and from 25 to 85, more preferably from 40 to 60, mole percent of the units derived from an alkyl ester of an ethylenically unsaturated carboxylic acid.

In a particularly preferred embodiment of the invention, the phenolic antimicrobial agent is attached to the polymer through quaternisation of the amino group of the polymer i.e. the covalent linkage between the phenolic antimicrobial agent and the polymer comprises a quaternary nitrogen atom. Preferably, the phenolic antimicrobial agent is attached to the quaternised nitrogen atom through a linking group comprising an alkylene group e.g. an oxyalkylene group. The alkylene group preferably comprises from 1 to 12, more preferably from 2 to 6, carbon atoms.

The degree of quaternisation is preferably from 10 to 65, more preferably from 20 to 30, percent.

The phenolic antimicrobial agent is preferably 2-phenylphenol.

Particularly preferred polymers of the invention have the structure

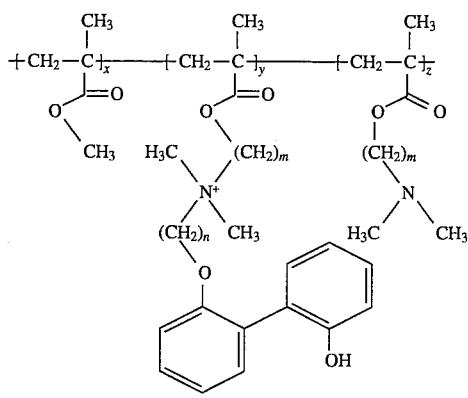

wherein x: (y+z) is in the range from 25:75 to 85:15, preferably from 40:60 to 60:40;

y: z is in the range from 10:90 to 65:35; and, each n and m independently is an integer from 1 to 12, preferably from 2 to 6.

The most preferred polymer has x: (y+z)=1:1, y: z=1:3, m=2 and n=3.

The polymers can be dissolved or dispersed in a variety of solvents including water and aqueous organic solvents to form the composition of the invention. The composition may also comprise one or more additional components such as cleaning agents, surfactants, emulsifiers, solubilizers, chelating agents, pH control agents, corrosion inhibitors, fragrances, deodorizers and antimicrobial agents.

For any particular composition, such optional ingredients should be compatible with the other ingredients present.

The solutions or dispersions of the antimicrobial polymer can be applied to a surface in a number of ways e.g. by wiping or spraying. Hard surfaces suitable for coating with the polymer include surfaces composed of refractory materials such as glazed and unglazed tile, brick, porcelain, ceramics and glass; metals; plastics e.g. polyester; fibreglass and other hard surfaces known to the industry.

Coatings of the antimicrobial polymer can be used on any surface requiring protection. A specific example is use on surfaces found in homes e.g. bathroom and kitchen surfaces.

EXAMPLE 1

The attachment of 2-phenylphenol to a random copolymer is described.

0'-(6-Hydroxyhexyl)-2,2'-biphenol 2,2'-Biphenol (5.0 g, 27 mmol) was added to a suspension of sodium hydride (1.06 g, 27 mmol) in DMF (30 ml) at room temperature. After 1 hour 6-iodo-1-hexanol (6.16 g, 27 mmol) was added and the mixture stirred for 18 hours at room temperature. Water (40 ml) was added followed by dilute hydrochloric acid to pH4. The mixture was extracted into diethyl ether (3×40 ml). The combined extracts were washed with water (3×15 ml) and dried over magnesium sulphate. The ether was removed on a rotatory evaporator to give an orange oil which was purified by column chromatography on silica gel (mesh 63–200) using 30% ethyl acetate/petroleum ether (b.p. 40/60) to remove the impurities and 40% ethyl acetate/petroleum ether to elute the product as a colourless oil (6.46 g, 84%). Found: C, 75.09; H, 7.71 $C_{18}H_{22}O_3$ requires: C, 75.50; H, 7.74.

Synthesis of the Prepolymer
[Poly(dimethylacrylamide-co-maleic Anhydride)]

Dimethylacrylamide was purified by vacuum distillation (318 K., 1 mmHg), while maleic anhydride was recrystallised from hot dichloromethane. A vessel was charged with 0.1 mol(9.9 g) dimethylacrylamide, 0.1 mol (9.8 g) maleic anhydride, 2.1 mmol (0.3 g) of azo-bis-isobutrylonitrile (AIBN) initiator and 120 ml of dry 1,4-dioxan. The resulting mixture was heated at 333 K. for 15 hours under dry nitrogen gas. The polymer was isolated by precipitation in petroleum ether (60–80) and then dried in vacuo.

N.M.R. indicated that the product component ratio was 1.35:1 in favour of the acrylamide.

Attachment of Phenol 13 mmol(3 g) of the prepolymer [5.5 mmol of active anhydride] was dissolved in 30 ml of dry dimethylformamide, to which 6.6 mmol (1.78 g) of 0'-(6-hydroxyhexyl)-2,2'-biphenol and 0.1 g of toluene sulphonic acid was added. The reaction mixture was left stirring for 15 hours at 333 K. The polymer was precipitated into acetone and then dried in vacuo.

N.M.R. indicates that the polymer is hygroscopic, possibly due to the slow hydrolysis of unreacted anhydride. Approximately 17 mol % of the available anhydride rings have been opened by the addition of the phenol.

I.R. indicates addition of the aromatic ring system (phenol) to the polymer, but there is still anhydride left.

EXAMPLE 2

O'-(3-Chloropropyl)-2,2'-biphenol 2,2'-Biphenol (5.0 g, 27 mmol) was added to a suspension of sodium hydride (1.06 g, 27 mmol) in DMF (30 ml) at room temperature. After 45 mins 1-bromo-3-chloropropane (4.25 g, 27 mmol) was added and the mixture stirred for 18 h at ambient temperature. Water (40 ml) was added followed by dilute hydrochloric acid to pH 3–4. The mixture was extracted into diethyl ether (3×40 ml). The combined extracts were washed with water (3×15 ml), dried over magnesium sulphate and solvent removed under reduced pressure to give a pale orange oil. Purification by column chromatography on silica gel (mesh 63–200) eluting with 2–10% ethyl acetate in petrol gradient gave the title compound as a colourless viscous oil (6.22 g, 83%).

A similar procedure was followed replacing 1-bromo-3-chloropropane with 1-bromo-4-chlorobutane, 1-bromo-5-chloropentane and 1-bromo-6-chlorohexane to produce the respective O'-(n-chloroalkyl)-2,2'-biphenols.

Synthesis of Prepolymer 0.6M (60 g) of methylmethacrylate and 0.6M (94.5 g) of dimethylaminoethylmethacrylate were dissolved in 450 ml of 1,4 dioxan and the solution was degassed for 15 minutes. AIBN was added and the solution was heated to 75° C. for 3 hours. The solution was cooled and the polymer was isolated by precipitation into petroleum ether (40–60). Further purification was achieved by redissolving the polymer in acetone and reprecipitating in petroleum ether. The polymer was then dried under vacuum at 60° C. for 24 hours. The polymer had a weight average molecular weight of 148,500 (polymethylmethacrylate equivalent by SEC) with a polydispersity of 2.06. Polymerisation yield was 58% and NMR measurements showed that the prepolymer comprised units derived from methylmethacrylate and dimethylaminoethylmethacrylate in the molar ratio 1:1, respectively.

Quaternization of the Prepolymer with O'-(3-chloropropyl)-2,2'-biphenol 1 g of prepolymer (containing 3.34 mmol of active amine sites), 1.25 g (4.76 mmol) of O'-(3-chloropropyl)- 2,2'-biphenol and 0.14 g of potassium iodide were dissolved in 40 ml of 1,4 dioxan. The mixture was then heated at reflux for 24 hours and cooled. The resulting polymer was isolated by precipitation into petroleum ether and then dried under vacuum at 60° C. for 24 hours. NMR measurements showed 25% quaternisation.

EXAMPLE 3

Synthesis of Prepolymer 0.06M (6 g) of methylmethacrylate, 0.06M (9.4 g) of dimethylaminoethylmethacrylate and 0.3 g AIBN were dissolved in dry 1,4-dioxan (80 ml). The above solution was heated at 60° C. for 16 hours under nitrogen. The resulting polymer was recovered by precipitation into hexane, reprecipitated from acetone/diethyl ether and dried for 48 hours in vacuo.

The prepolymer comprised units derived from methylmethacrylate and dimethylaminoethylmethacrylate in the molar ratio 1:1, with a weight average molecular weight of 30,000 (polymethylmethacrylate equivalent by SEC).

Quaternization of the Prepolymer with O'-(3-chloropropyl)-2,2'-biphenol 2 g of prepolymer (3.9 mmol) and 3.08 g O'-( 3-chloropropyl)-2,2'-biphenol (11.7 mmol) were dissolved in 40 ml dry 1,4-dioxan and refluxed for 20 hours under nitrogen. The resulting polymer was recovered by precipitation into hexane and reprecipitated from acetone/hexane, then dried in vacuo.

The antimicrobial polymer thus produced had a degree of quaternization of 55% of the active (dimethylamino) sites.

EXAMPLE 4

Synthesis of Prepolymer

Following the procedure of Example 3, a prepolymer was prepared comprising units derived from methylmethacrylate and dimethylaminoethylmethacrylate in the molar ratio 1:3, respectively.

Quaternisation of the Prepolymer with O'-(3-chloropropyl)- 2,2'-biphenol

Following the procedure of Example 3, the prepolymer was quaternised with O'-(3-chloropropyl)- 2,2'-biphenol.

EXAMPLE 5

Synthesis of Prepolymer

Following the procedure of Example 3, a prepolymer was prepared comprising units derived from dimethylacrylamide and dimethylaminoethylmethacrylate in the molar ratio 5:1, respectively.

Quaternisation of the Prepolymer with O'-(3-chloropropyl)-2,2'-biphenol

Following the procedure of Example 3, the prepolymer was quaternised with O'-(3-chloropropyl)- 2,2'-biphenol.

EXAMPLE 6

Synthesis of Prepolymer

Following the procedure of Example 3, a prepolymer was prepared comprising units derived from dimethylacrylamide and dimethylaminoethylmethacrylate in the molar ratio 3:1, respectively.

Quaternisation of the Prepolymer with O'-(3-chloropropyl)-2,2'-biphenol

Following the procedure of Example 3, the prepolymer was quaternised with O'-(3-Chloropropyl)- 2,2'-biphenol.

EXAMPLE 7

Synthesis of Active Prepolymer

Following the procedure of Example 3, a prepolymer was prepared comprising units derived from dimethylacrylamide and dimethylaminoethylmethacrylate in the molar ratio 0.9:1, respectively.

Quaternisation of the Prepolymer with O'-(3-chloropropyl)-2,2'-biphenol

Following the procedure of Example 3, the prepolymer was quaternised with O'-(3-chloropropyl)- 2,2'-biphenol.

EXAMPLE 8

Synthesis of Prepolymer

Following the procedure of Example 3, a prepolymer was prepared comprising units derived from dimethylacrylamide and dimethylaminoethylmethacrylate in the molar ratio 1:2, respectively.

Quaternisation of the Prepolymer with 0'-(3-chloropropyl)- 2,2'-biphenol

Following the procedure of Example 3, the prepolymer was quaternised with 0'-(3-chloropropyl)- 2,2'-biphenol.

EXAMPLE 9

Synthesis of Prepolymer

Following the procedure of Example 3, a prepolymer was prepared comprising units derived from N-vinylpyrrolidone and dimethylaminoethylmethacrylate in the molar ratio 3:1, respectively.

Quaternisation of the Prepolymer with 0'-(3-chloropropyl)- 2,2'-biphenol

Following the procedure of Example 3, the prepolymer was quaternised with 0'-(3-chloropropyl)- 2,2'-biphenol.

EXAMPLE 10

Synthesis of Prepolymer

Following the procedure of Example 3, a prepolymer was prepared comprising units derived from methylmethacrylate and dimethylaminoethylmethacrylate in the molar ratio 1:1, respectively.

Quaternisation of the Prepolymer with 3-allyl-2'-(3-chloropropyloxy)- 2-hydroxybiphenyl Following the procedure of Example 3, the prepolymer was quaternised with 3-allyl-2'-(3-chloropropyloxy)- 2-hydroxybiphenyl.

The antimicrobial polymer thus produced had a degree of quaternization of 21% of the active (dimethylamino) sites.

EXAMPLE 11

Synthesis of Prepolymer

Following the procedure of Example 3, a prepolymer was prepared comprising units derived from methylmethacrylate and dimethylaminoethylmethacrylate in the molar ratio 1:1, respectively.

Quaternisation of the Prepolymer with 4-(3-chloropropyloxy)carbonylphenol

Following the procedure of Example 3, the prepolymer was quaternised with 4-(3-chloropropyloxy)carbonylphenol.

The antimicrobial polymer thus produced had a degree of quaternization of 34% of the active (dimethylamino) sites.

EXAMPLE 12

One-Pot Preparation of Polymer in Ethanol

Dimethylaminoethylmethacrylate (7.67 g) and methylmethacrylate (7.33 g) were dissolved in ethanol (60 g) and the solution purged with nitrogen. AIBN (0.0375 g, 0.25wt %) was added and the mixture heated to 80° C. and maintained at this temperature for 18 h. A sample was taken for analysis ($M_w$=88,600 {polymethylmethacrylate standard} and dispersivity=3.2). O'-(3-chloropropyl)-2,2'-biphenol (16.0 g) was added and the mixture maintained at 80° C. for 24 h. On cooling the polymer was precipitated into diethyl ether, filtered, dissolved in acetone and reprecipitated in diethyl ether to give a polymer with 54% of amino groups quaternized (by nmr) in a yield of 48%.

EXAMPLE 13

Polymer Preparation by Suspension Polymerization

Sodium chloride (40 g) was dissolved in distilled water (400 ml) and polyvinyl alcohol (PVA, 88% hydrolysed $M_w$=125,000, 1 g) added. The solution was heated to 80° C. and purged with nitrogen for 15 mins under mechanical stirring. A solution of AIBN (1.17 g) in dimethylaminoethylmethacrylate (26.55 g) and methylmethacrylate (24.43 g) was added linearly over 45 mins and the reaction maintained at 80° C. for 4 h. A sample was removed for analysis ($M_w$=175,000, dispersivity 2.8). O'-(3-chloropropyl)-2,2'-biphenol (44.4 g) in toluene (50 ml) was added and the reaction left at 80° C. for 24 h. On cooling the toluene layer was washed with water to remove sodium chloride and PVA and with ether to remove residual low molecular weight species. On drying a slightly off-white powder remained which showed a 2:1 monomer ratio (methylmethacrylate-:dimethylaminoethylmethacrylate) and 49% amino groups quaternized, in 60% yield.

EXAMPLE 14

Antimicrobial Efficacy

The efficacy of certain antimicrobial polymer solutions against bacteria dried onto a test surface was examined. Glass microscope slides cut into 20×25 mm sections were used to represent non-porous surfaces.

Horse serum was added directly to a 24 hour liquid culture of *S. Aureus to give a* 5% solution. 10 µl of this solution was then spread evenly on the surface of each test surface using a sterile wire spreader. Innoculated slides were then dried at 35° C. for 15 minutes.

After the innoculum had dried, duplicate slides were treated by spreading with 50 µl of the polymer solution prepared in aqueous ethanol solvent. Antimicrobial polymers were used to give 50 mM solutions of the active phenolic moiety while the corresponding prepolymers were used as controls at concentrations equivalent to the amount of polymer present in the active solutions.

A pair of innoculated slides were left untreated to determine the number of bacteria surviving the drying process.

After a contact time of 5 minutes, the slides were transferred to test tubes containing 20 ml letheen broth and votexed for 10 seconds followed by sonication for 3 minutes in an ultra-sonic cleaning bath.

Following sonication, the tubes were again vortexed for 10 seconds and serially diluted down to $10^{-3}$. The number of viable bacteria remaining was then determined.

Percentage reductions were calculated by comparing the number of viable bacteria on test slides with those obtained from the untreated innoculated slides. The percentage reduction within 5 minutes achieved with a number of different polymers is shown in the following Table.

TABLE 1

| Polymer | % Reduction |
| --- | --- |
| Prepolymer of Example 3 | 0 |
| Polymer of Example 3 | 99.97 |
| Prepolymer of Example 4 | 33.60 |
| Polymer of Example 4 | 99.97 |
| Prepolymer of Example 5 | 30.78 |
| Polymer of Example 5 | 99.70 |
| Prepolymer of Example 6 | 51.40 |
| Polymer of Example 6 | 99.97 |
| Prepolymer of Example 7 | 87.65 |
| Polymer of Example 7 | 99.97 |
| Prepolymer of Example 8 | 72.19 |
| Polymer of Example 8 | 99.97 |
| Prepolymer of Example 9 | 66.88 |
| Polymer of Example 9 | 99.97 |

EXAMPLE 15

Prolonged Antimicrobial Efficacy

Retention of antimicrobial activity after repeated washes with water and microbial challenges was examined.

Glass microscope slides cut into 20×25 mm sections were used to represent non-porous surfaces.

Polymer solutions were prepared having a concentration of the active phenolic group of 50 mM. Test surfaces were coated with polymer solution and allowed to dry.

Horse serum was added directly to a 24 hour liquid culture of *S. Aureus* or *K. Pneumoniae* to give a 5% solution. For initial sanitisation determination, 10 µl of this solution was spread evenly over a polymer coated slide with a wire spreader. For residual sanitisation determination, each side of a polymer coated slide was first washed with 20 ml of sterile water prior to application of the innoculum. Control non-antimicrobial polymer and untreated glass were also innoculated.

After 5 minutes exposure, the slides for initial and first use (wash) activity determination were transferred to 20 ml letheen broths and treated in accordance with the procedure given in Example 14.

For residual activity, slides that had been used once (wash and innoculation) were again washed on each side with a further 20 ml sterile water, and a fresh innoculum applied. This procedure was repeated until the required number of uses (wash and application of bacteria) had been reached. At this stage, the slides were transferred to 20 ml letheen broth and the number of viable bacteria determined as described in Example 14.

The polymers tested comprised units derived from methylmethacrylate and dimethylaminoethylmethacrylate in the molar ratio 1:1 and quaternised with O'-(3-chloropropyl)-2,2'-biphenol.

The results for such a polymer of $M_w$ 73,000 and having a degree of quaternisation of about 23% are shown in Table 2 below.

TABLE 2

| | log reduction in count | |
| --- | --- | --- |
| | Staph. aureus | Klebsiella pneumoniae |
| Use 1 | 3.818 | 2.578 |
| Use 3 | 4.663 | 4.562 |
| Use 5 | 3.158 | 4.562 |
| Use 7 | 4.663 | 4.562 |

A desired performance standard of a 3-log reduction, compared to the glass controls, was reached at Use 3 and maintained for the remainder of the test. Activity at Use 1 was also reasonable.

The results for the polymer of Example 2 of $M_w$ 148,500 and having a degree of quaternisation of 25% are shown in Table 3 below.

TABLE 3

| | log reduction in count | |
| --- | --- | --- |
| | Staph. aureus | Klebsiella pneumoniae |
| Use 1 | 4.39 | 2.20 |
| Use 3 | 4.39 | 4.62 |
| Use 5 | 4.09 | 0.69 |
| Use 7 | 2.26 | 0.51 |

A 1:1 polymer blend was made from the 1:1 (monomer ratio) polymers of $M_w$ 30,000 and 150,000 and gave the following results shown in Table 4 below:

TABLE 4

| | log reduction in count | |
| --- | --- | --- |
| | Staph. aureus | Klebsiella pneumoniae |
| Use 1 | 3.28 | 0.37 |
| Use 3 | 4.22 | 3.66 |
| Use 5 | 4.22 | 4.56 |
| Use 7 | 4.22 | 4.56 |

EXAMPLE 16

Using the method of Example 15, the efficacy of a solution of the polymers of Examples 10 and 11 against *S. Aureus* and *Klebsiella Pneumoniae* was determined.

The results for the polymer of Example 10 are shown in Table 5 below.

TABLE 5

| | No. bacteria recovered per slide | % reduction |
| --- | --- | --- |
| Innoculum | $3.70 \times 10^6$ | — |
| Initial | $3.73 \times 10^6$ | — |
| Use 1 | $2.13 \times 10^6$ | 42.43 |
| Use 3 | $1.99 \times 10^5$ | 94.62 |
| Use 5 | $1.76 \times 10^4$ | 99.52 |
| Use 7 | $1.60 \times 10^3$ | 99.96 |

The results for the polymer of Example 11 are shown in Table 6 below.

TABLE 6

| | No. bacteria recovered per slide | % reduction |
|---|---|---|
| Innoculum Initial | $8.90 \times 10^6$ Overgrown | — — |
| Use 1 | $8.80 \times 10^3$ | 99.88 |
| Use 3 | $6.60 \times 10^4$ | 99.11 |
| Use 5 | $1.40 \times 10^5$ | 98.11 |
| Use 7 | $4.80 \times 10^5$ | 93.51 |

EXAMPLE 17

The polymer of Example 2 was dissolved in 10% aqueous ethanol and a series of normal suspension tests against *S. aureus* were carried out to determine the concentration dependence of activity. From the series of results a dilution factor was calculated. The results were compared to those obtained using 2-phenylphenol and are shown in Table 7 below.

TABLE 7

| Concentration | Time to achieve 3log reductions in bacterial count (mins) |
|---|---|
| Polymer: | |
| 10 μM (phenol equivalents) | 19.0 |
| 15 μM (phenol equivalents) | 6.5 |
| 20 μM (phenol equivalents) | 4.5 |
| 30 μM (phenol equivalents) | 2.0 |
| 2-Phenylphenol | |
| 2.5 mM | not achieved |
| 3.0 mM | 8.5 |
| 3.5 mM | 3.5 |
| 4.0 mM | 2.0 |

The results show that the polymer kills at the same rate as the free phenol at 133 lower concentration.

The dilution factor is defined as the slope of the plot of log (time to achieve kill) vs log (concentration). It is known that for free phenols this is about 6. The data from the above experiments give dilution factors of 1.9 for the polymer and 5.7 for the 2-phenylphenol. This means that a 2-fold dilution of polymer solution decreases activity by 3.7 times whilst for 2-phenylphenol activity is reduced by 52 times.

Compared to 2-phenylphenol, the equivalent phenol concentration on the polymer required for >3 log reductions in bacterial count is >100 times less.

EXAMPLE 18

Sanitizing Compositions

The following formulation examples shown in Table 8 below were prepared.

TABLE 8

| | Formulation Examples | |
|---|---|---|
| Composition | 1 | 2 |
| Antimicrobial Polymer (Example 2) | 6.0 | — |

TABLE 8-continued

| | Formulation Examples | |
|---|---|---|
| Composition | 1 | 2 |
| Ethanol | 85.995 | 85.995 |
| Other (Frag. Buffer, Corrs. Inhib) | 0.726 | 0.726 |
| DI water | 7.29 | 13.28 |

Procedure for Residual Sanitizing Activity:
Preparation of Culture Suspension, Media and Test Surface Preparation of test organism, media and test surfaces were in accordance with the EPA Sanitizer Test for Non-Food Contact Surfaces Method as outlined in the US EPA Pesticide Assessment Guidelines Subdivision G: Product Performance, Recommended method #8, 1982.

Treatment of Test Surfaces

Sterile one inch square glass slides were treated with the formulation example. Each slide was coated with the test treatment and allowed to air dry at room temperature for 24 hours.

Evaluation for Residual Sanitizing Activity

Three treated slides were evaluated for each set of washes with water.

After drying three treated slides were washed 1× with 20 ml sterile water. After washing, each slide was inoculated with 0.01 ml. of *Staphylococcus aureus*. Inoculum remained in contact with the treated slide for 5 minutes. After 5 minute contact, each slide was subcultured in letheen broth neutralizer and plate counts conducted to enumerate surviving organisms.

For residual activity with additional washes, slides that have been treated once (wash and inoculation) are again washed with sterile water and a fresh inoculum applied. The procedure is repeated until the required number of uses (wash and application of bacteria) has been reached. At this stage, slides are transferred to letheen broth and the number of viable bacteria determined.

The performance standard requires that the antimicrobial polymer surface should give at least 99.9% reduction in count when compared to untreated control slides. The results are shown in Table 9 below.

TABLE 9

RESIDUAL SANITIZING ACTIVITY
vs. *S. aureus*

| # of Washes & Inoculations | Avg # of Bacteria Recovered per slide (3) Formulations | | | Percent Reduction in Bacterial Numbers vs. Control Formulations | |
|---|---|---|---|---|---|
| | Control | 1 | 2 | 1 | 2 |
| 1 | 2,500,000 | 770 | 730,000 | 99.96 | 70.8 |
| 3 | 700,000 | 33 | 1,900,000 | 99.99 | 0 |
| 5 | 1,700,000 | 110 | 860,000 | 99.99 | 49.41 |
| 7 | 900,000 | 26 | 460,000 | 99.99 | 48.88 |

Results

For a hard surface sanitizer claim for non-food contact surfaces, a 99.9% reduction in count of number of organism, when compared to the control numbers is required.

Example formulation 1 with the antimicrobial polymer exhibits residual sanitizing activity against *S. aureus* after at least a regimen of 1–7 washes with water and contaminations with bacteria. Formulation #2 without antimicrobial polymer did not show sanitizing activity after washes with water:

Residual Fungistatic Activity

The following formulation examples shown in Table 10 below were prepared.

TABLE 10

| Composition | Formulation Examples | |
|---|---|---|
|  | 1 | 2 |
| Antimicrobial Polymer (Example 2) | 6.0 | — |
| Polymer Base (No Antimicrobial) | — | 5.0 |
| Anhydrous alcohol | Q.S. to 100 | Q.S. to 100 |

Procedure for Residual Fungistatic Activity

Test organism and preparation according to the Hard Surface Mildew Fungistatic Test Method as outlined in the US EPA Pesticide Assessment Guidelines Subdivision G.: Product Performance pg. 145–148 11/82.

Treatment of Test Surfaces

Three glazed porcelain tiles were treated with the formulation example. Each tile was coated with the test treatment and allowed to air dry at room temperature for 24 hours.

Evaluation for Residual Fungistatic Activity

Treated tiles were washed with 20 ml. 0.2% Ivory Soap solution. After washing, each tile surface was inoculated with 0.01 ml. of *A. Niger* conidial suspension and allowed to dry at 30° C. for 30 min. After drying, each tile was placed on water agar and incubated at 25° C. for one month. Each tile was washed and reinoculated with *A. Niger* up to 12 times. Tiles were observed weekly for fungal growth.

For residual fungistatic activity, no fungal growth should be apparent on treated tiles after repeated washes and reinoculations. Growth must be apparent on the control tiles. The results are shown in Table 11 below.

TABLE 11

RESIDUAL FUNGISTATIC ACTIVITY
Results on Glazed Tile (3)
*Aspergillus niger*

| # of washes & inculations | Formulations | |
|---|---|---|
|  | 1 | 2 |
| 3 | − | + |
| 5 | − | + |
| 7 | − | + |
| 10 | − | + |
| 12 | − | + |

Results

Formulation 1 with antimicrobial polymer exhibits residual fungistatic activity after at least 12 repeated washes with Ivory soap solutions and reinoculations with mold. Base polymer without antimicrobial was not effective in inhibiting mold growth.

Conclusion—Summary of Results

These results show that the antimicrobial polymer in formulation provides residual sanitizing and fungistatic activity. Residual activity means continued activity even after repeated washes with water and reinoculations of test surfaces with bacteria and mold.

We claim:

1. A polymer having antimicrobial properties containing a phenolic antimicrobial agent covalently bound through a quaternary nitrogen atom to one or more polymerised ethylenically unsaturated monomer units selected from the group consisting of ethylenically unsaturated carboxylic acids, ethylenically unsaturated carboxylic anhydrides, aminoalkyl esters of ethylenically unsaturated carboxylic acids, hydroxyalkyl esters of ethylenically unsaturated carboxylic acids, glycidyl esters of ethylenically unsaturated carboxylic acids, ethylenically unsaturated nitrogen containing heterocycles, and ethylenically unsaturated monomers comprising a haloalkyl group.

2. A polymer according to claim 1 further comprising polymerised monomer units selected from the group consisting of one or more alkyl esters of ethylenically unsaturated carboxylic acids, alkyl amides of ethylenically unsaturated carboxylic acids, ethylenically unsaturated nitrogen contining heterocycles and ethylenically unsaturated aromatic compounds.

3. A polymer according to claim 1 in which the polymerised monomer units consist of dialkylaminoalkyl esters of an ethylenically unsaturated carboxylic acid.

4. A polymer according to claim 3 wherein the dialkylaminoalkyl ester of an ethylenically unsaturated carboxylic acid is dimethylaminoethylmethacrylate.

5. A polymer according to claim 3 or claim 4 further comprising polymerised monomer units derived from an alkyl ester of an ethylenically unsaturated carboxylic acid.

6. A polymer according to claim 5 wherein the alkyl ester of an ethylenically unsaturated carboxylic acid is methylmethacrylate.

7. A polymer according to claim 6 comprising from 16 to 75 mole percent of the units derived from the aminoalkyl ester of an ethylenically unsaturated carboxylic acid and from 25 to 85 mole percent of the units derived from the alkyl ester of an ethylenically unsaturated carboxylic acid.

8. A polymer according to claim 7 wherein the phenolic antimicrobial agent is 2-phenylphenol.

9. A sanitising composition comprising a polymer containing a phenolic antimicrobial agent covalently bound through a quaternary nitrogen atom to one or more polymerised ethylenically unsaturated monomer units selected from the group consisting of ethylenically unsaturated carboxylic acids, ethylenically unsaturated carboxylic anhydrides, aminoalkyl esters of ethylenically unsaturated carboxylic acids, hydroxyalkyl esters of ethylenically unsaturated carboxylic acids, glycidyl esters of ethylenically unsaturated carboxylic acids, ethylenically unsaturated nitrogen containing heterocycles, and ethylenically unsaturated monomers comprising a haloalkyl group, said polymer being dissolved or dispersed in a solvent.

10. A composition according to claim 9 which provides prolonged antimicrobial activity.

11. A composition according to claim 9 which provides residual fungistatic activity.

* * * * *